UNITED STATES PATENT OFFICE 2,389,211

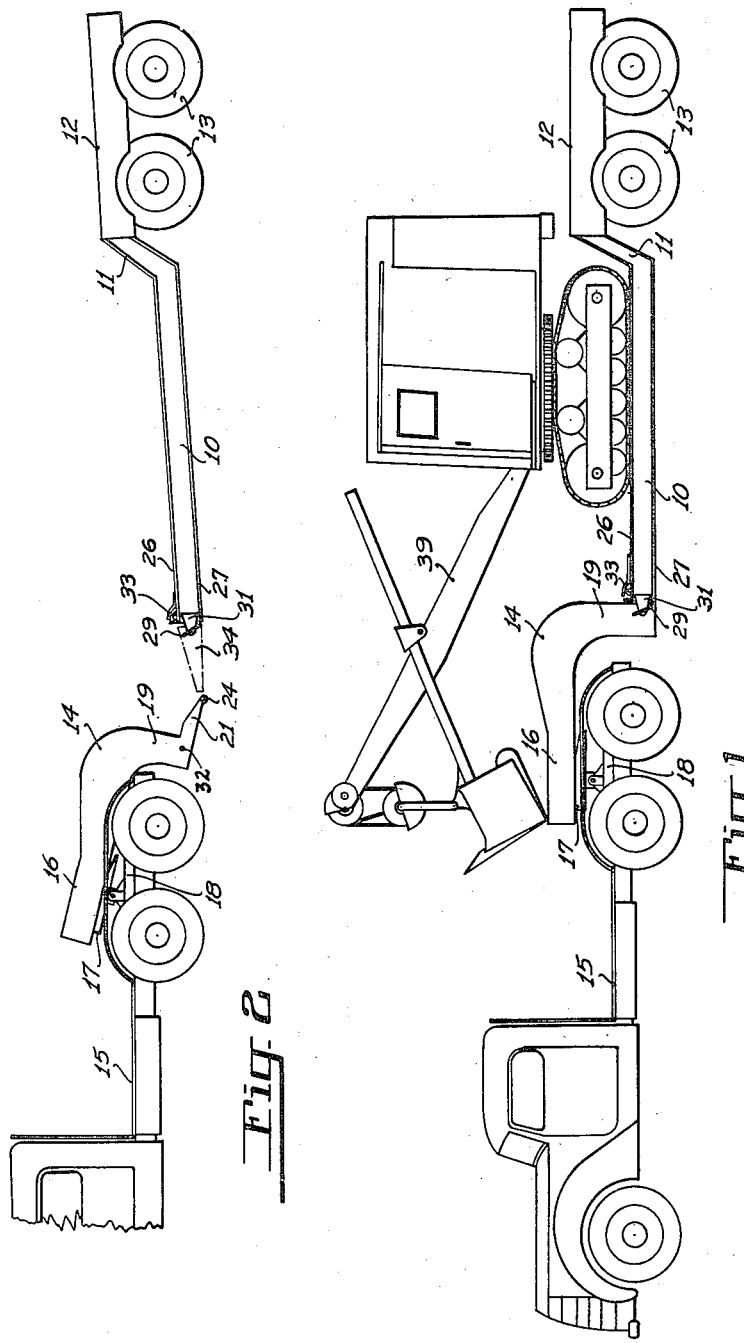

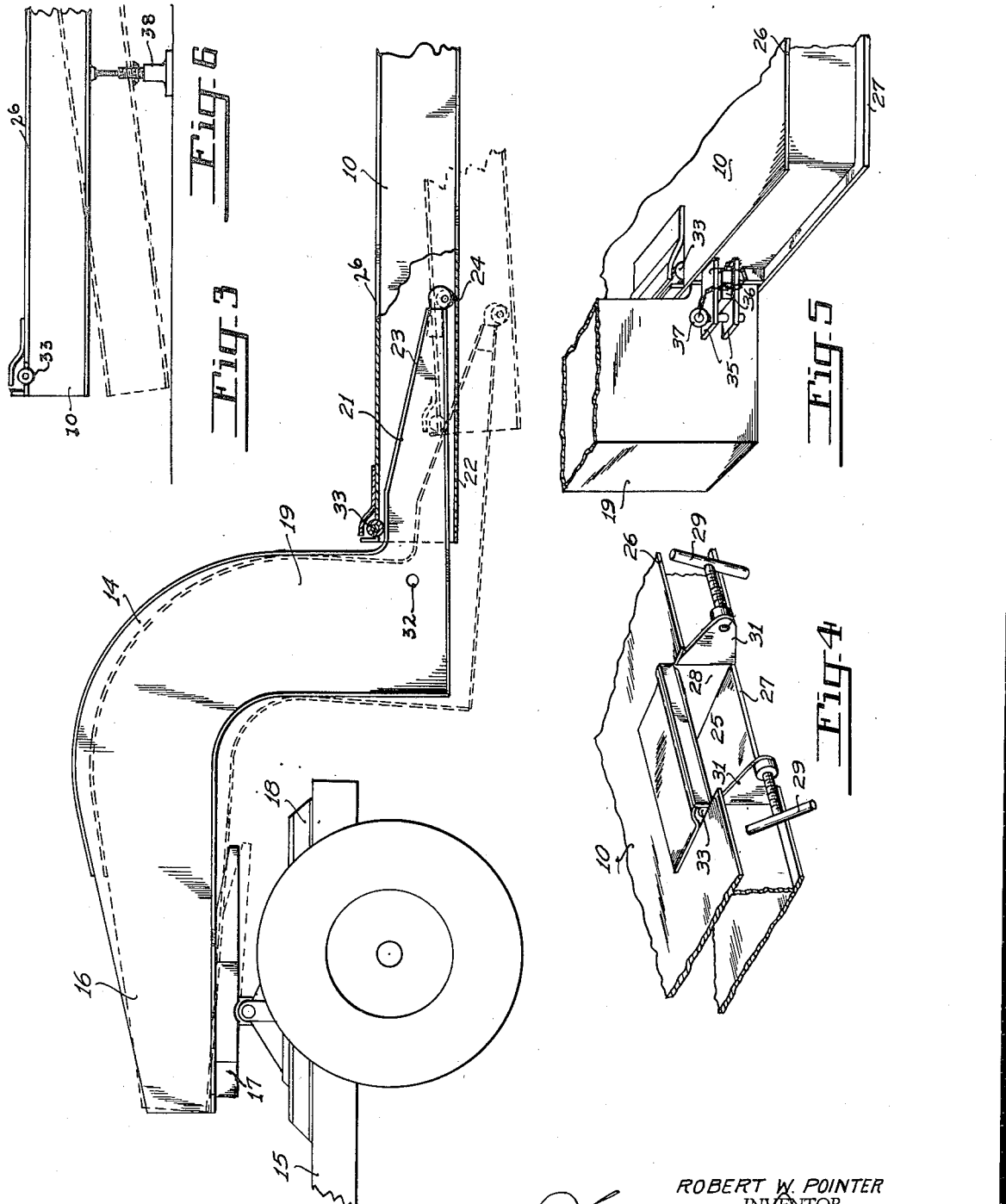

LOW BED TRAILER

Robert W. Pointer, Portland, Oreg.

Application January 25, 1943, Serial No. 473,468

4 Claims. (Cl. 280—33.1)

The present invention relates to trailers, and has particular reference to trailers of the type commonly referred to as a semi-trailer, for use where it is needful that the center of gravity of the load be kept at an absolute minimum height above the ground.

The trailer is particularly applicable as a conveyance for heavy equipment such as tractors, power shovels and the like, which it may be necessary to transport from one place of use to another. While this type of equipment is of itself mobile under its own power, the rate of travel is exceedingly slow and the track elements are generally of a type that is forbidden on hard surfaced public roads. Furthermore, because of their size and slow rate of travel under their own power, they constitute a serious menace to other traffic. Thus it has become a general practice to transport such equipment from place to place by means of heavy duty trucks and trailers.

It is usually not practical, however, to carry heavy machinery upon present type of trucks and trailers for the reason that the high center of gravity of equipment loaded on a truck bed involves the hazard of upsetting the truck; and also because of impaired clearances prevailing along many rights of way. Furthermore, the loading of such equipment onto the truck presents serious problems, and usually requires a loading dock or relatively long, gradually inclined ramp construction. Such facilities are usually not conveniently at hand at either the loading or the unloading points.

A low bed trailer of the type herein disclosed is particularly suitable for handling equipment of the type referred to, since the bed, being supported relatively close to the ground, permits a low center of gravity for the load, and the overall height of the load is reduced to an absolute minimum. A disadvantage inherent in present types of low bed trailers is occasioned by reason of the fact that these are unit structures and obviously necessitate loading the equipment from the side. In order to load heavy machinery on a conventional low bed trailer it is necessary to construct a small ramp and also to block up the side of the trailer from which the load is directed. Due to the limited overall width of conveyances which use public thoroughfares, it is impossible to turn the piece of equipment after it has been loaded from the side of the trailer, for the reason that the length of the track elements of the equipment is too nearly the width of the trailer bed, in which case the equipment would have to overhang the trailer bed and involve not only a violation of law but also a serious traffic hazard is so transported.

The principal object of the present invention, therefore, is to provide a new and improved low bed trailer which is particularly useful for hauling loads of unusual tonnage which may be loaded onto the trailer bed without the need of a loading dock, ramp or other special loading and unloading facilities.

It is a further object of the invention to provide a low bed trailer onto which relatively large units of heavy machinery may be driven endwise of the trailer under their own power.

It is a further object of the invention to provide a semi-trailer having a low center of gravity and being so constructed that the trailer bed may be detached from a supporting truck in such manner as to permit loading of the trailer from one end thereof.

More specifically stated, it is an object of the present invention to provide a new and improved low bed trailer supported upon its own truck at the rear end thereof, while its forward end is adapted to be supported upon the rear end of a prime mover vehicle, the forward end of the trailer being so constructed that the trailer bed may readily be loaded endwise from the forward end thereof before attachment to the prime mover vehicle.

A further object of the invention is to provide a new and improved low bed trailer which may be detached from the prime mover vehicle, loaded from the forward end thereof, and then reattached to the prime mover vehicle without the use of special equipment.

In accordance with the illustrated embodiment of the invention, a semi-trailer is provided comprising an elongated bed including a frame, the rear end of which frame extends upwardly from the bed and is mounted upon a truck including a wheel assembly. The forward end of the trailer bed is adapted to be supported upon the rear end of a prime mover vehicle such as a heavy duty truck. The supporting means for the forward end of the trailer comprises a frame unit having one extension for overlying the rear end of the prime mover vehicle to which the frame unit is pivotally attached for movement in both vertical and horizontal planes. The frame unit has a second lower extension extending rearwardly from a downwardly depending intermediate section, which lower extension is adapted to be received in a longitudinal recess extending rearwardly from the forward end of the trailer bed. Means are provided for removably attaching the forward end of the trailer bed to the frame unit whereby the trailer bed is supported in a substantially horizontal position relatively close to the ground. For loading and unloading heavy equipment onto the trailer bed, the attaching means at the forward end of the trailer bed are loosened and the prime mover vehicle is driven forwardly for withdrawing the lower extension of the frame unit from the trailer bed. As the frame extension is withdrawn from the trailer bed the frame unit pivots about its horizontal pivot and tilts rearwardly for lowering the forward end of the trailer bed to the ground. Machinery to be transported, such as a tractor, power shovel or the like, may then be loaded endwise of the trailer bed by driving it thereupon without requiring need of a ramp, loading dock or other special loading facilities. Where the load is of excessive weight the trailer bed may be lowered to loading position and elevated to the frame unit engaging position by the use of jacks. Upon desiring to unload the trailer, jacks are positioned under the forward end of the trailer bed for unloading the frame unit, whereupon the prime mover vehicle is driven forwardly, withdrawing the lower extension of the frame unit from the trailer bed. Thereupon, the jacks supporting the forward end of the trailer bed are lowered to permit the trailer end to rest upon the ground. When it is desired to reengage the trailer bed and the frame unit, the jacks supporting the forward end of the trailer bed are actuated to elevate the trailer bed into position to be engaged by the frame unit extension.

Other objects and advantages of the invention will become apparent from a study of the following description of the invention, taken in connection with the accompanying drawings, while the features of novelty will be pointed out with greater particularity in the appended claims.

In the drawings: Figure 1 is a side elevation of a low bed trailer embodying the principles of the invention and illustrated as being attached to the rear end of a prime mover truck. Figure 2 is a side elevation illustrating the trailer in a disassembled relation and in position to be loaded or unloaded, as well as in position to be reassembled with the front end frame unit. Figure 3 is an enlarged fragmentary view illustrating the supporting arrangement for the forward end of the trailer bed and showing in dotted line the initial coupling position between the front end frame unit and the trailer bed. Figure 4 is a fragmentary view in perspective of a portion of the forward end of the trailer bed. Figure 5 is an isometric detail view illustrating a modification of the fastening element for securing the trailer bed to the front end frame unit. Figure 6 illustrates the manner in which jacks may be employed to elevate and lower the forward end of the trailer bed to and from the load transporting position.

Referring to the drawings, the trailer embodying the invention comprises an elongated load supporting platform or bed 10 having a frame, the rear end of which extends upwardly, as indicated at 11, and is rigidly connected to a rearward frame extension 12. The frame extension 12 is suitably mounted upon a truck including one or more sets of wheels 13. The forward end of the bed 10 is adapted to be supported by means of a detachable frame unit 14 upon the rear end of a prime mover vehicle 15.

The frame unit 14 is constructed in the form of a gooseneck, the upper arm 16 of which is provided with fifth wheel members 17 which, when coordinated with the fifth wheel mounting 18 on the prime mover vehicle 15, provides for pivotal movement of the frame unit in both horizontal and vertical planes. Beyond the rear end of the prime mover vehicle 15 the frame unit 14 depends downwardly as indicated at 19 and is provided at its lower end with a rearwardly extending arm 21. The arms 16 and 21 of the frame unit 14 lie in substantially parallel horizontal planes and are offset vertically with relation to each other.

The rearwardly extending arm 21 constitutes a wedge shaped member comprising a base plate 22 and an inclined top plate 23, the top plate 23 extending downwardly from a point adjacent the frame portion 19 to a point substantially in the plane of the base plate 22. At the outer end of the rearwardly extending arm 21 is mounted a transverse roller 24, the periphery of which extends slightly below the plane of the surface of the base plate 22. The function of the roller 24 is to support the rearward end of the frame unit 14 when detached from the trailer by providing rolling engagement with the ground surface, and, more particularly, to facilitate assembly and disassembly of the trailer bed 10 with the frame unit 14 as presently described. The arm 21 is adapted to be received within the end of the trailer platform 10 and to be secured with respect thereto whereby the bed 10 is supported in a generally horizontal position in the manner clearly illustrated in Figure 1.

As illustrated in the fragmentary view of Figure 4, the forward end of the trailer bed 10 is provided with a recess 25 extending longitudinally and centrally of the trailer. The recess 25 is defined by the plate 26 comprising the platform of the trailer bed and by a lower plate 27 and side walls 28. The bed plate 26 and plate 27 are spaced apart a distance slightly greater than are the base plate 22 and top plate 23 of the rearward extension 21 of the frame unit 14, and the recess 25 extends longitudinally within the frame of the trailer for a distance sufficient to receive therewithin the full length of the rearward extension 21. With the rearward extension 21 fitted to the recess 25, the bed 10 is securely fastened to the frame unit 14 by any suitable fastening means such as a pair of T-bolts 29, 29 threaded into extensions 31 of the side walls 28. The T-bolts 29 are adapted to engage with threaded openings 32 provided in the corresponding side walls of the frame unit 14 for rigidly securing the trailer bed to the frame unit 14 and hence to the vehicle chassis.

For facilitating movement of the frame extension 21 relative to the trailer bed recess 25 a roller 33 is suitably journaled in the forward edge portion of the bed plate 26 for engaging the inclined top plate 23 of the frame extension 21. During such movement the roller 24, similarly journaled at the outer end of the frame extension 21, rides upon the upper surface of the lower plate 27.

When it is desired to load or unload the trailer the fastening means, such as the T-bolts 29 are loosened, the wheels 13 of the rear truck of the trailer are blocked, and the prime mover vehicle 15 is driven forwardly to cause the frame unit 14 to disengage the trailer bed. As the frame extension 21 is slowly withdrawn from the recess 25 in the trailer bed 10, the roller 33 rides down the inclined surface 23, the inclination thereof increasing downwardly as the frame unit 14 is permitted to tilt rearwardly, thus lowering the forward end of the trailer bed 10 to the ground. It will be understood that to accomplish lowering of the trailer bed the frame unit 14 pivots as indicated in Figure 2, permitting the frame extension 21 to incline downwardly as it is withdrawn from the recess 25 in the trailer bed. The prime mover vehicle may then be driven away from the trailer bed, leaving the front end of the trailer bed upon the ground as shown in Figure 2. Thereupon, a pair of wedge blocks 34 (shown in broken line in Figure 2) may be placed at the front end of the trailer bed and spaced apart to accommodate the wheels or tracks of an apparatus to be loaded on the trailer, and the apparatus may then be driven onto the trailer bed over the forward end thereof. Primarily, the function of the wedge blocks 34 is to prevent mutilation of the forward edge of the bed plate 26.

The trailer bed having been loaded, the prime mover vehicle is reversed and caused to approach the forward end of the trailer bed. The rearward extension 21 which rolls along the road bed upon its roller 24 is aligned with the recess 25 and caused to enter therein. When it has entered into the recess to the extent indicated in broken lines in Figure 3, it has reached its initial effective position and further movement of the prime mover vehicle in the direction of the trailer will cause the trailer bed to be lifted to the load transporting position.

As will be seen by examination of the dotted line position of the elements in Figure 3, the rollers 24 and 33 of the frame unit 14 and the trailer bed 10, respectively, are in close longitudinal proximity upon initiation of the lifting movement. As the frame extension 21 enters the recess 25 longitudinal separation of the rollers 24 and 33 while confined within the fixed vertical limits of the recess 25 will force the bed plate 26 and lower plate 27, and hence the trailer bed frame, into parallel relation with the base plate 22 of the frame extension 21.

Figure 5 illustrates a modified form of fastening means for securing the trailer bed 10 to the frame unit 14. The structure illustrated comprises two pairs of ears 35 secured to the forward end of the trailer bed 10 and extending forwardly therefrom in spaced parallel relation. The pairs of ears are spaced apart laterally of the trailer bed a distance corresponding to the spacing of the fastening means shown in Figure 4 in order that the frame extension 21 may enter the recess 25 between the pairs of ears 35. A lug 36 is secured to each side of the frame unit 14 in position to enter between each pair of ears 35 when the frame extension 21 is fully engaged within the recess 25. A pin 37 placed in aligned holes in the ears of each pair prevents withdrawal of the lug 36 from between the ears and so prevents disengagement of the trailer bed 10 from the frame unit 14.

In Figure 6 is illustrated the use of jacks 38 for lowering and elevating the forward end of the trailer bed 10 when disengaged from the frame unit 14. It is deemed to be entirely within the scope of the invention to make use of such auxiliary lowering and elevating means, particularly when the load carried upon the trailer bed is of excessive weight. In such instances, prior to detaching the trailer bed 10 from the frame unit 14, as by removal of the T-bolts 29 from the threaded openings 32 or removal of the pins 37 from the holes in the ears 35, the jacks 38 are placed under the trailer bed 10 adjacent the forward end thereof but spaced sufficiently from the forward end of the trailer bed so that when the jacks are collapsed the end of the trailer bed will rest upon the roadway. Thereupon, the jacks are actuated to unload the frame unit 14 and the prime mover vehicle is driven away from the trailer bed 10 for a distance sufficient to completely withdraw the frame extension 21 from the recess 25. Thereupon, the jacks are collapsed to lower the front end of the trailer bed to the roadway. The jacks may also be used when it is desired to elevate the forward end of the trailer bed into position to be engaged by the frame extension 21. This operation would appear to be obvious and to need no further explanation.

Because of the fact that the foremost end of the trailer bed 10 may thus be lowered to the ground, no loading dock or ramp need be provided for loading mobile equipment thereupon. It will be obvious that the load, shown in this instance as comprising a power shovel 39, may be of any other type and may or may not be mobile under its own power. While the width of the trailer bed may be limited by highway regulations, the length thereof may vary in accordance with the overall length of the particular machine intended to be transported thereby. By loading the machine endwise upon the trailer bed, and due to the fact that the center of gravity for the load is relatively close to the ground, overall dimensions of the load, both as to width and height, are reduced to a minimum.

Having now described my invention and in what manner the same may be used, what I claim as new and desire to protect by Letters Patent is:

1. A device for coupling a semi-trailer to a prime mover vehicle comprising a cantilever frame adapted to be mounted on a prime mover vehicle, said cantilever frame extending downwardly with respect to the rear end of the prime mover vehicle and having a rearwardly extending member, the upper surface of said member being inclined upwardly in the forward direction, a load supporting platform adapted to be detachably coupled to said cantilever frame, means defining a longitudinally extending recess in the forward end of said platform for receiving said rearwardly extending member, a transverse bearing surface provided in the upper forward end of said recess and bearing upon said inclined surface during engagement and disengagement of said frame and said platform whereby said platform is elevated from a loading position to a load transporting position as said member enters said recess.

2. A device for coupling a semi-trailer to a prime mover vehicle comprising a cantilever frame adapted to be mounted on a prime mover vehicle, said cantilever frame extending downwardly with respect to the rear end of the prime mover vehicle and having a rearwardly extending member, the upper surface of said member being inclined upwardly in the forward direction, a load supporting platform adapted to be detachably coupled to said cantilever frame, means defining a longitudinally extending recess in the forward end of said platform for receiving said rearwardly extending member, a roller journaled in the forward end of said recess and bearing upon said inclined surface during engagement and disengagement of said frame and said platform whereby said platform is elevated from a loading position to a load transporting position as said member enters said recess.

3. A device for coupling a semi-trailer to a prime mover vehicle comprising a cantilever frame adapted to be mounted on a prime mover vehicle, said cantilever frame extending downwardly with respect to the rear end of the prime mover vehicle and having a rearwardly extending member, a roller journaled in the rearward end of said member, the upper surface of said member being inclined upwardly in the forward direction, a load supporting platform adapted to be detachably coupled to said cantilever frame, means defining a longitudinally extending recess in the forward end of said platform for receiving said member, said means including a base plate comprising the lower horizontal wall of said recess, a roller journaled in the forward end of said recess, said first roller bearing upon said base plate and said second roller bearing upon said inclined surface during engagement and disengagement of said frame and said platform whereby said platform is elevated from the loading position to a load transporting position as said member enters said recess.

4. A device for coupling a semi-trailer to a prime mover vehicle comprising a cantilever frame adapted to be mounted on a prime mover vehicle, said cantilever frame extending downwardly with respect to the rear end of the prime mover vehicle and having a rearwardly extending member, a load supporting platform adapted to be detachably coupled to said cantilever frame, means defining a longitudinally extending recess in the forward end of said platform for receiving said member, a roller journaled in said member and bearing upon the framework of said platform during engagement and disengagement of said cantilever frame and said platform, and a roller journaled in said platform and bearing upon said member during engagement and disengagement of said platform and said cantilever frame whereby said platform is moved between load transporting and loading positions during relative longitudinal movement of said cantilever frame and the platform.

ROBERT W. POINTER.